United States Patent
Kondo

[11] Patent Number: 6,159,893
[45] Date of Patent: Dec. 12, 2000

[54] HONEYCOMB STRUCTURE AND METHOD OF PRODUCING THE SAME

[75] Inventor: Tosiharu Kondo, Toyoake, Japan

[73] Assignee: Denso Corporation, Kariya, Japan

[21] Appl. No.: 09/276,496

[22] Filed: Mar. 25, 1999

[30] Foreign Application Priority Data

Mar. 27, 1998 [JP] Japan ................................. 10-100297
Nov. 18, 1998 [JP] Japan ................................. 10-328384

[51] Int. Cl.[7] .............................. B01J 21/08; B01J 21/10; B01J 21/12; B01J 21/14

[52] U.S. Cl. ......................... 502/251; 502/232; 502/240; 502/250; 502/263; 502/527.19; 502/527.24

[58] Field of Search .................................. 502/232, 240, 502/250, 251, 263, 527.19, 527.24

[56] References Cited

U.S. PATENT DOCUMENTS 4,327,188  4/1982  Endo et al. .
4,489,774  12/1984  Ogawa et al. ............................. 165/10
4,632,683  12/1986  Fukutani et al. .
4,698,317  10/1987  Inoue et al. ............................. 501/9
4,849,275  7/1989  Hamaguchi et al. ................... 428/116

FOREIGN PATENT DOCUMENTS

52-97383  8/1977  Japan .
56-89844  7/1981  Japan .
61-83689  4/1986  Japan .
61-129015  6/1986  Japan .
4-110041  4/1992  Japan .

*Primary Examiner*—Elizabeth D. Wood
*Attorney, Agent, or Firm*—Pillsbury Madison & Sutro LLP

[57] ABSTRACT

A honeycomb structure in which partitioning walls comprising, as a chief component, cordierite of a chemical composition containing 45 to 55% by weight of $SiO_2$, 33 to 42% by weight of $Al_2O_3$, and 12 to 18% by weight of MgO are formed in the shape of a honeycomb. The partitioning walls have a thickness of not larger than 250 $\mu$m and a porosity of from 45 to 80%.

3 Claims, 6 Drawing Sheets

HONEYCOMB STRUCTURE AND METHOD OF PRODUCING THE SAME

BACKGROUND OF THE INVENTION

1. Field of the Invention

The present invention relates to a honeycomb structure made of cordierite used as a catalyst carrier, in a device for cleaning exhaust gases from an internal combustion engine, and to a method of producing the same.

2. Description of the Related Art

Figure 1:
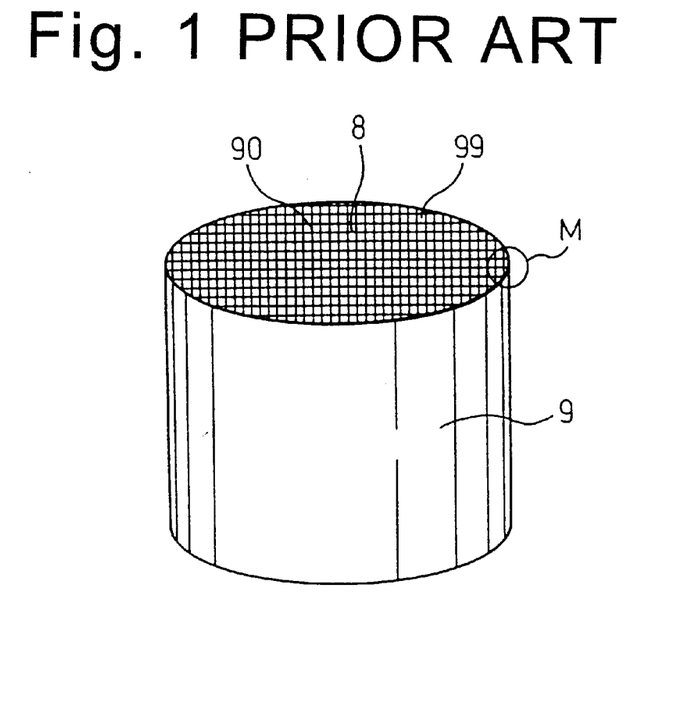
FIG. 1 is a view illustrating the appearance of a honeycomb structure according to a prior art.
Figure 2:
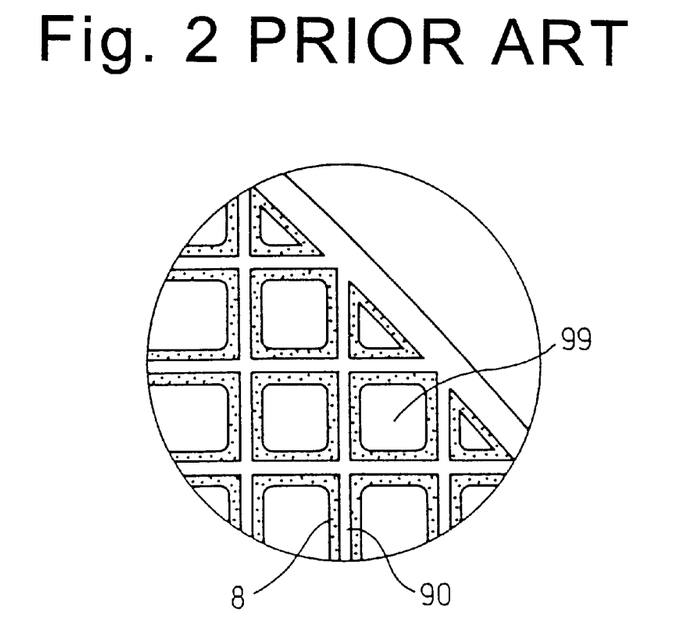
FIG. 2 is an enlarged view illustrating a portion M in FIG. 1.

As a catalyst carrier for a device for cleaning exhaust gases, as shown in FIGS. 1 and 2, there has heretofore been used a honeycomb structure 9 in which partitioning walls 90 made of cordierite are arranged in the form of a honeycomb to form a number of cells 99. A catalyst 8 for cleaning exhaust gases is carried on the surfaces of the partitioning walls 90 of the honeycomb structure 9 to exhibit the function of cleaning exhaust gases.

With respect to the honeycomb structure in recent years, as stringent regulations are enforced against exhaust gases from the automobiles, it has been urged to activate the catalyst of the device for cleaning exhaust gases as quickly as possible. To cope with this, there has been proposed a method of lowering the heat capacity of the honeycomb structure as a whole to shorten the time period for elevating the temperature. Concretely, the thickness of the partitioning walls in the honeycomb structure is decreased, to decrease the weight of the catalyst carrier, in order to lower the heat capacity.

However, a limitation is imposed on decreasing the weight by decreasing the thickness of the partitioning walls due to problems from the standpoint of production. It has therefore been desired to develop means for lowering the heat capacity of the honeycomb structure as a whole relying upon a method other than the method of decreasing the thickness of the partitioning walls.

The catalyst is carried by the partitioning walls of the honeycomb structure by coating the partitioning walls with a slurry containing the catalyst, followed by drying. In the conventional honeycomb structure, the partitioning walls have a low water-absorbance, and the amount of the slurry that can be applied at one time is small. Therefore, the application and drying are repeated slurry several times, or a slurry containing the catalyst at a high concentration must be applied.

Figure 3:
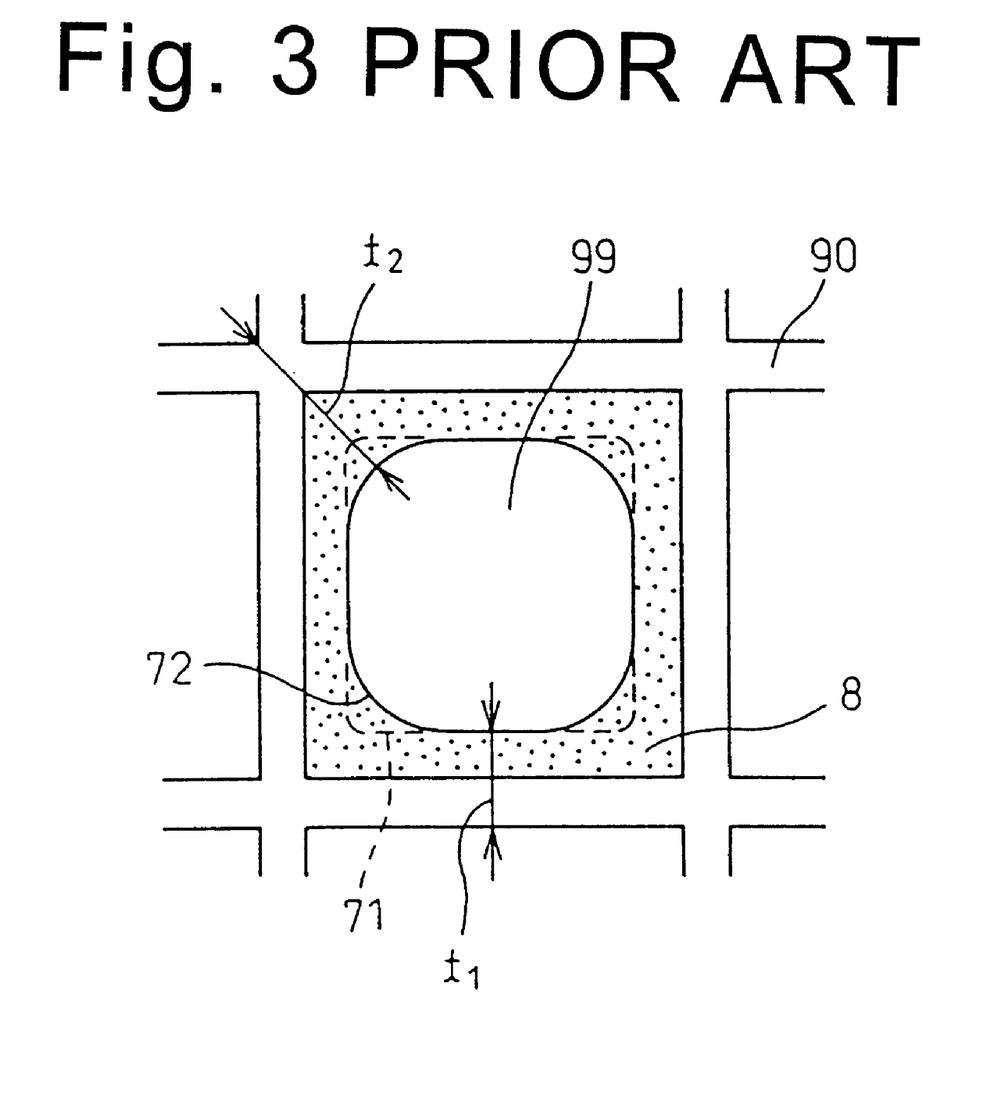
FIG. 3 is a view illustrating a state where the catalyst is carried according to a prior art.

The application of several times greatly decreases a production efficiency. When the slurry having a high concentration is applied, on the other hand, the thickness $t_2$ of the catalyst carried at the corners of the cells 99 become very large; losing balance relative to the thickness $t_1$ of the catalyst carried on general portions, as shown in FIG. 3. Concretely, it is desired that the surface of the catalyst layer is located at position of a broken line 71 in FIG. 3, but the thickness of the catalyst layer increases up to the position of a solid line 72.

In this case, the surface areas decrease in the cells, and the reaction-promoting effect of the catalyst decreases. Also, this increases the flow resistance of gases passing through the cells. In other words, the efficiency of the catalytic reaction decreases.

Therefore, it has heretofore been desired to develop a honeycomb structure having partitioning walls exhibiting water-absorbability larger than that of the prior art and capable of being coated with a slurry having a suitable degree of concentration in an amount larger than that of the prior art.

The present invention was accomplished in view of the problems inherent in the above prior art, and provides a honeycomb structure having partitioning walls exhibiting excellent water-absorbability and is capable of activating the carried catalyst within a short period of time, and a method of producing the same.

SUMMARY OF THE INVENTION

The present invention resides in a honeycomb structure in which partitioning walls (i.e., cell walls), comprising, as a chief component, cordierite of a chemical composition containing 45 to 55% by weight of $SiO_2$, 33 to 42% by weight of $Al_2O_3$, and 12 to 18% by weight of MgO, are formed in the shape of a honeycomb, said partitioning walls (i.e., cell walls) having a thickness of not larger than 250 μm and a porosity of from 45 to 80%.

In the present invention, the partitioning walls preferably have a thickness of not larger than 250 μm and a porosity of from 45 to 80%.

If the thickness of the partitioning walls exceeds 250 μm, it becomes difficult to decrease the weight of the honeycomb structure. Preferably, the thickness of the partitioning walls is not larger than 110 μm. It is, on the other hand, desired that the lower limit of the thickness of the partitioning wall is 50 μm from the standpoint of current production technology.

If the porosity of the partitioning walls is smaller than 45%, the effects of weight reduction and water-absorbability improvement, by an improved porosity, are less. If the porosity exceeds 80%, on the other hand, it becomes difficult to maintain the strength even though the structure of the carrier is improved.

DETAILED DESCRIPTION OF THE INVENTION

Action and effect of the present invention will now be described.

The honeycomb structure of the present invention is constituted by the partitioning walls having a thickness of not larger than 250 μm and a porosity of from 45 to 80%. Compared to the conventional honeycomb structure, therefore, the honeycomb structure of the present invention makes it possible to greatly decrease the weight and to increase the water-absorbability.

That is, the conventional honeycomb structure has a porosity of generally about 35%, and a limitation is imposed on decreasing the weight even if the thickness of the partitioning walls decrease. According to the present invention, on the other hand, the weight of the honeycomb structure can be further decreased by improving the porosity to within the above-mentioned particular range while the partitioning walls have a thickness similar to that of the prior art.

According to the present invention, therefore, the heat capacity of the honeycomb structure can be decreased to be smaller than that of the prior art, enabling the carried catalyst to be activated within a short period of time.

Upon increasing the porosity of the partitioning walls to a range of from 45 to 80%, the partitioning walls exhibit an improved water-absorbing ability compared with that of the prior art. When the partitioning walls are coated with a catalyst-containing slurry, therefore, the amount of coating can increase compared with that of the prior art. Due to the increase in the amount of the coating, the catalyst concentration in the slurry (slurry concentration) can be decreased in comparison with that of the prior art while the catalyst remains in the partitioning walls in the same amount as that of the prior art.

If the concentration of the slurry can be decreased, the viscosity of the slurry can decrease and, hence, it is possible to eliminate the inconvenience inherent in the prior art that the coated slurry is excessively thickly deposited at the corners of the cells.

This makes it possible to enhance the catalyst-carrying efficiency (reaction efficiency) to be greater than that of the prior art.

Thus, according to the present invention, there is provided a honeycomb structure having partitioning walls that exhibit excellent water-absorbing ability, enabling the carried catalyst to be activated within a short period of time, and a method of producing the same.

Moreover, the honeycomb structure of the present invention serves as a catalyst carrier that carries a catalyst on the surfaces of the partitioning walls. In this case, the above-mentioned honeycomb structure can be used as a catalyst carrier in a catalytic converter for cleaning exhaust gases emitted from, for example, automobiles.

Next, in order to produce the above-mentioned excellent honeycomb structure, the present invention provides a honeycomb structure in which partitioning walls, comprising, as a chief component, cordierite of a chemical composition containing 45 to 55% by weight of $SO_2$, 33 to 42% by weight of $Al_2O_3$, and 12 to 18% by weight of MgO, are formed in the shape of a honeycomb, said partitioning walls having a thickness of not larger than 250 $\mu$m and a porosity of from 45 to 80%.

In the production method of the present invention, the starting materials for cordierite preferably contain 5 to 15 parts by weight of combustible particles.

If the combustible particles are added in an amount of less than 5 parts by weight to the starting materials for cordierite, the occupation ratio of fine pores formed in the partitioning walls decreases and a high porosity is not accomplished. If the amount of addition exceeds 15 parts by weight, on the other hand, the occupation ratio of fine pores in the partitioning walls increases too much, and the partitioning walls lose the strength.

The action and effect of the production method will be described next.

The production method uses the starting materials for cordierite to which are added combustible particles having particular particle diameters in the above-mentioned particular amount. During the firing, after the kneading, forming and drying, the combustible particles burn and disappear, to form fine pores in the partitioning walls.

The content of the combustible particles is limited to the above-mentioned particular ratio. Therefore, the occupation ratio of fine pores formed in the partitioning walls is controlled, making it possible to easily attain a porosity of from 45 to 80%.

Therefore, the production method of the present invention makes it possible to easily obtain the above-mentioned excellent honeycomb structure.

It is desired that the combustible particles are carbon particles. This makes it possible to relatively easily obtain combustible particles having particular particle diameters and to decrease the cost of production.

As the combustible particles, there can be used various combustible substances such as sawdust, crumbs of bread or foaming agents instead of the carbon particles.

In the above-mentioned production method, there can be used silica, talc and aluminum hydroxide as the starting materials for cordierite, and their contents may be adjusted to control the porosity. For example, the silica and talc promote the formation of pores due to the migration of the components in the step of firing reaction. The aluminum hydroxide promotes the formation of pores as the crystallization water in the starting materials evaporates.

Embodiment 1

The honeycomb structure and the production method according to an embodiment of the present invention will now be described with reference to FIGS. 4 to 6.

As shown in FIGS. 1 and 2, the honeycomb structure of this embodiment contains partitioning walls 90 in the shape of a honeycomb, comprising, as a chief component, cordierite of a chemical composition containing 45 to 55% by weight of $SiO_2$, 33 to 42% by weight of $Al_2O_3$, and 12 to 18%o by weight of MgO, said partitioning walls 90 having a thickness of not larger than 250 $\mu$m and a porosity of from 45 to 80%.

In this embodiment, a honeycomb structure (sample E1) which is the product of the present invention constituted as described above and a honeycomb structure (sample C1) which is a conventional product for comparison, were actually prepared and were evaluated for their effect of decreasing the weight and of activating the catalyst in a short period of time. The two honeycomb structures (E1, C1) were 76 mm in outer diameter, 85 mm in length and 400 mesh, having a thickness of the partitioning walls of 110 $\mu$m.

Described below, first, is the method of producing the sample E1 which is the product of the present invention.

To produce the sample E1, first, starting materials for cordierite were used as shown in Tables 1 and 2. As will be obvious from these Tables, the honeycomb structure of the sample E1 was prepared by mixing the starting materials for cordierite comprising kaolin, aluminum hydroxide, alumina, talc and carbon particles in amounts as shown in table 1 and, further, adding carbon particles having an average particle diameter of 1 $\mu$m in an amount of 15 parts by weight as combustible particles.

TABLE 1

| Starting materials | | Sample E1 (Invention) | | Sample C1 (prior art) | |
|---|---|---|---|---|---|
| | | Average particle size (/μm) | Content (parts by weight) | Average particle size (/μm) | Content (parts by weight) |
| Starting materials for cordierite | kaolin | 3–8 | 45 | 3–8 | 45 |
| | alumina | 3 | 5 | 3 | 20 |
| | talc | 15 | 20 | 15 | 35 |
| | carbon particles | 1 | 15 | — | 0 |
| binder | methyl cellulose | — | 5 | — | 5 |
| lubricating agent | glycerin | — | 3 | — | 3 |
| water | | — | 25 | — | 25 |

TABLE 2

| Starting materials | Composition of components (% by weight) | | | | | |
|---|---|---|---|---|---|---|
| | $SiO_2$ | MgO | $Al_2O_3$ | $Al(OH)_3$ | $Fe_2O_3$ | $CaO + Na_2O + K_2O$ |
| kaolin | 45.20 | 0.07 | 38.20 | — | 0.78 | 0.50 |
| Alumina | 0.01 | — | 99.50 | — | 0.01 | 0.23 |
| talc | 62.75 | 31.44 | 0.09 | — | 0.11 | 0.38 |

To the starting materials for cordierite were further added methyl cellulose as a binder, glycerin as a lubricant and water in predetermined amounts (Table 1).

The mixture was then kneaded and extruded into the shape of a honeycomb by using a die for forming a honeycomb. Next, the extruded intermediate material in the shape of a honeycomb was dried, cut into a predetermined size and was fired.

The firing was effected by raising the temperature up to 1400° C. at a rate of about 1° C. per minute, maintaining this temperature for 5 hours, and then gradually lowering the temperature down to room temperature. After the firing, the honeycomb structure was completed (sample E1).

Next, the sample C1 which is the conventional product was prepared by using the starting materials for cordierite having the same composition as that of the sample E1 of the present invention but without adding carbon particles as shown in Table 1. The conditions in other respects were the same as those for the sample E1 of the present invention.

Table 3 shows the specifications and properties of the obtained honeycomb structures (E1, C1).

The porosities were measured by the mercury intrusion porosity method by using a porosimeter.

Figure 4:
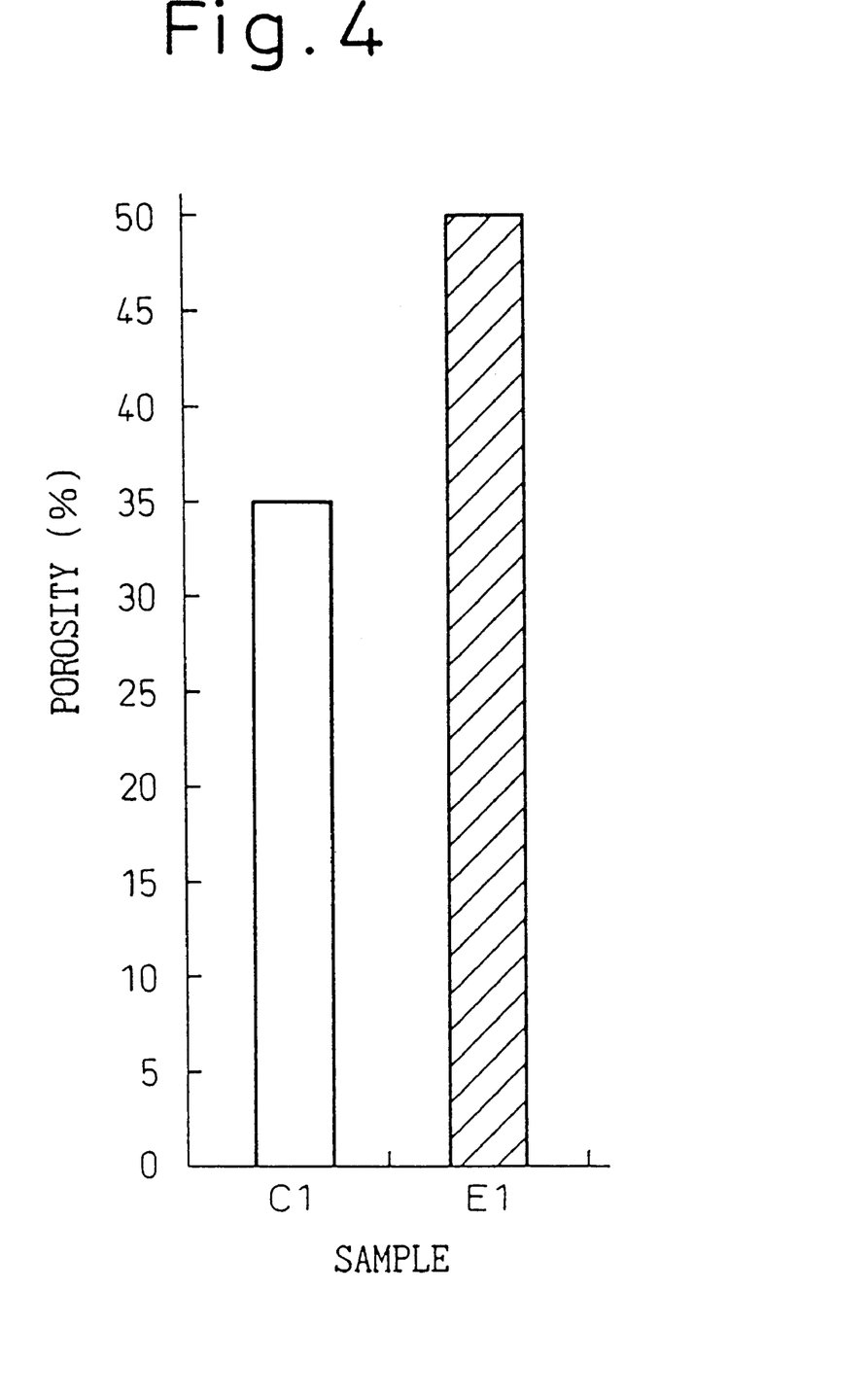
FIG. 4 is a diagram illustrating measured porosities of honeycomb structures according to an embodiment 1.

The measured results are shown in Table 3 and in FIG. 4, wherein the abscissa represents the kind of the honeycomb structure and the ordinate represents the porosity.

As will be learned from Table 3 and FIG. 4, the sample E1 which is the product of the present invention possessed a porosity of 50% which was significantly increased compared with the porosity of the conventional product C1.

Figure 5:
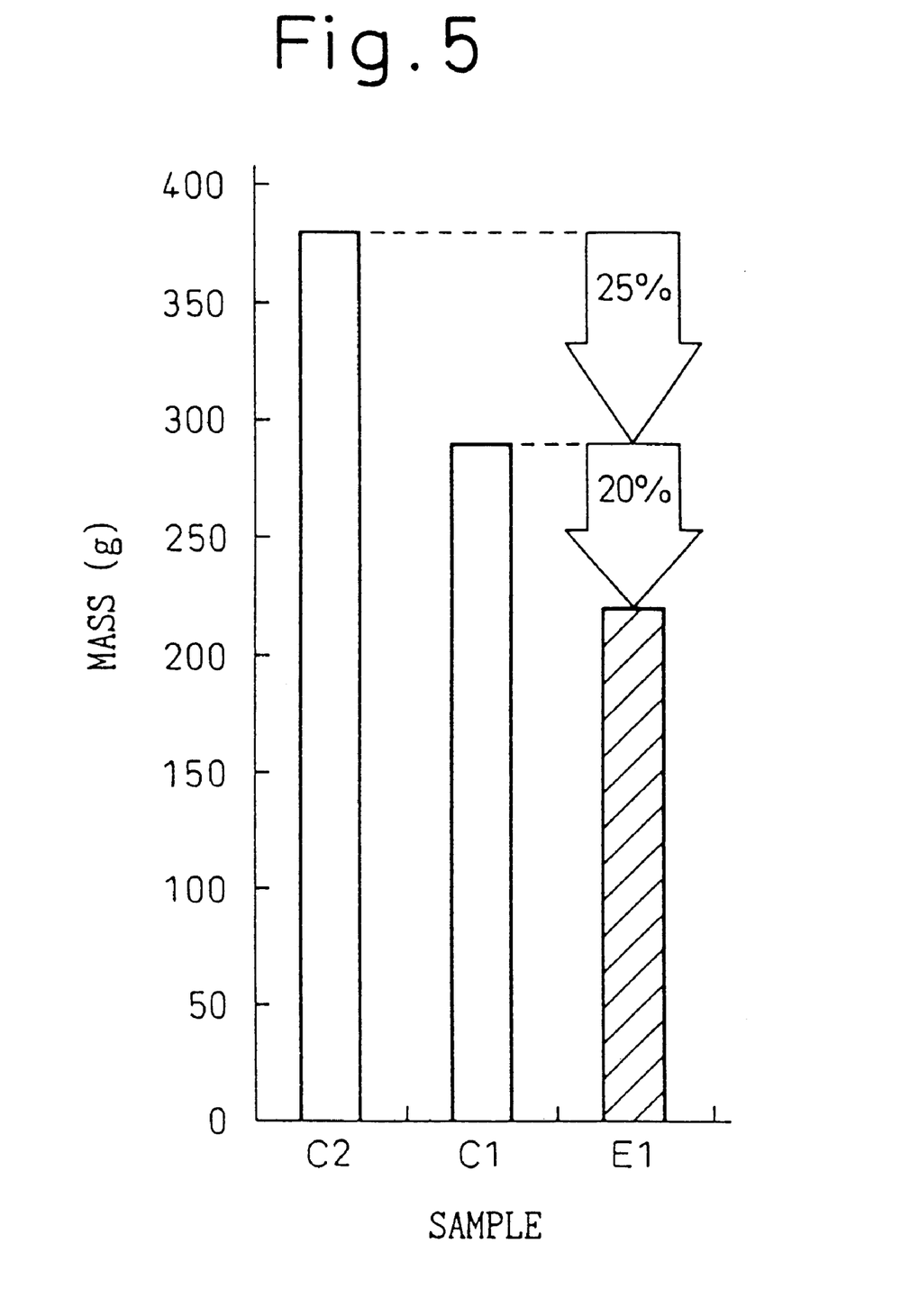
FIG. 5 is a diagram illustrating measured masses of the honeycomb structures according to the embodiment 1.

Next, the effects of decreasing the weight of the honeycomb structures (samples E1, C1) are shown in Table 3 and FIG. 5, wherein the abscissa represents the kind of honeycomb structure and the ordinate represents the mass of the honeycomb structure. For reference, FIG. 5 also shows a conventional product C2 which is a honeycomb structure, having partitioning walls of 150 μm thickness, that has heretofore been principally used. The conventional product C2 was prepared in the same manner as the above-mentioned conventional product C1.

As will be seen from Table 3 and FIG. 5, the conventional product C1 has a weight that is decreased by about 25% compared with that of the conventional product C2 as a result of decreasing the thickness of the partitioning walls. On the other hand, the product of the present invention has a weight that is further decreased by about 20% compared with that of the conventional product C1.

Table 3 further shows the water absorption rate, isostatic strengths and coefficients of thermal expansion of the samples E1 and C1. Here, an improvement in the water absorption rate of the sample E1 means an increase in the porosity bringing about the effect of decreasing the weight of the carrier.

The isostatic strength is found by attaching 20 mm aluminum plates to both end surfaces of the honeycomb structure, sealing the whole structure with a rubber tube, applying a hydrostatic pressure, and measuring the pressure at the time when the honeycomb structure is broken. The sample E1 exhibits an isostatic strength which is lower than that of the sample C1 due to an increase in the porosity, which is unavoidable. However, a decrease in the isostatic strength of this degree can be compensated by changing the shape of the honeycomb structure or by improving the canning for supporting the honeycomb structure.

TABLE 3

| | | Sample | |
|---|---|---|---|
| Item | Unit | E1 (Invention) | C1 (prior art) |
| cell wall thickness | mm | 0.11 | 0.11 |
| cell density | cpsi | 406 | 406 |
| mass | g/liter | 220 | 290 |
| porosity | % | 50 | 35 |
| water absorbability | % | 37.0 | 30.5 |
| isostatic strength | MPa | 1.7 | 3.5 |
| thermal expansion coefficient | $\times 10^{-6}/°$ C. | 0.6 | 0.5 |

In this embodiment, next, a catalyst was carried on the samples E1 and C1, and a test was conducted to quantitatively evaluate the catalyst activating properties of the samples. The catalyst was carried on each of the samples E1 and C1 in a carrying amount of 120 g/liter.

The test was conducted by mounting each of the samples in the exhaust system of a V8 gasoline engine having a displacement of 4000 cc, and steadily running the engine so that the temperature of the gases entering the sample was 500° C.

Figure 6:
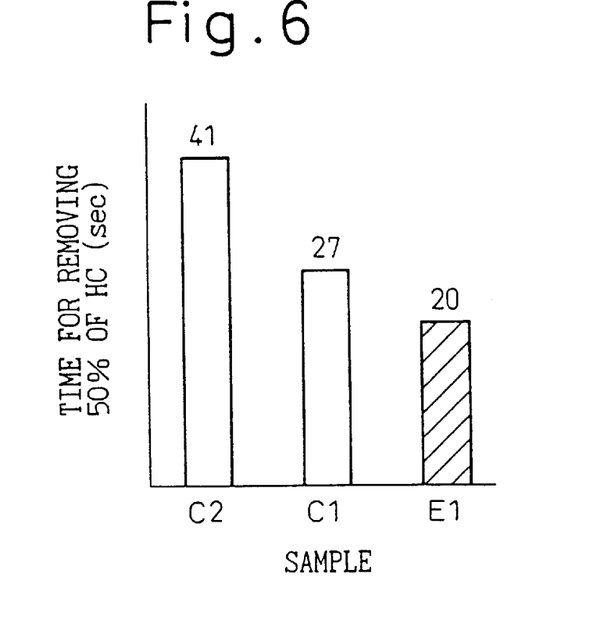
FIG. 6 is a diagram illustrating the time for activating the catalyst carried on the honeycomb structure according to the embodiment 1.

FIG. 6 shows the results of the test, wherein the abscissa represents the samples and the ordinate represents the time (seconds) until 50% of HC is removed.

It will be learned from FIG. 6 that the sample E1 which is the product of the present invention greatly shortened the time for activating the catalyst compared with that of the sample C1 which is the conventional product.

Embodiment 2

In this embodiment, the effect of porosity of the partitioning walls on the time for activating the catalyst was further investigated. Concretely, the porosity was changed over a range of from 25% to 85% based on the sample E1 of the embodiment 1, and the times were measured until 80% or more of HC was removed after the start of the engine. In other respects, this embodiment was the same as the embodiment 1.

Figure 7:
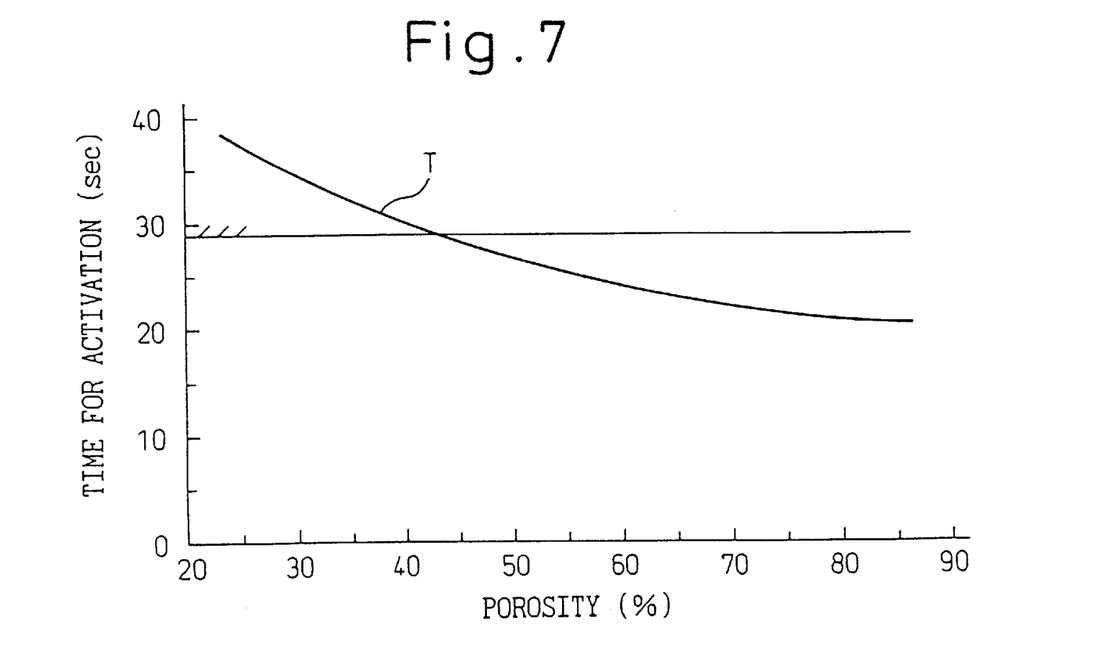
FIG. 7 is a diagram illustrating a relationship between the porosity and the time for activating the catalyst according to an embodiment 2.

FIG. 7 shows the results of the test, wherein the abscissa represents the porosity (%) and the ordinate represents the time T (seconds) until 80% or more of HC is removed.

As will be learned from FIG. 7, the time for activation is shortened and excellent cleaning performance is exhibited by an increase in the porosity. In practice, furthermore, it is desired that the time for activation is not longer than 28 seconds and, from this point of view, the porosity is preferably not smaller than 45%. Improved cleaning performance can be expected even when the porosity is not smaller than 80%. From the standpoint of maintaining the strength of the honeycomb structure, however, it is not at present desired to increase the porosity to more than 80%. Most desirably, therefore, the porosity is from 45 to 80%.

Embodiment 3

In this embodiment, the effect due to an increase in the water absorption rate of the partitioning walls of the honeycomb structure was quantitatively evaluated.

First, honeycomb structures were prepared while changing the porosity over a range of from 30 to 80% based on the sample E1 of the embodiment 1. Then, two kinds of tests were conducted by coating the partitioning walls of the honeycomb structures with two slurries of a slurry A having a high concentration and with a slurry B having a low concentration.

The slurries A and B were prepared by using a solvent and a solid containing catalyst components. When the whole amount of the slurry was regarded as 100% by weight, the slurry A contained the solid component in an amount of 46% by weight and the slurry B contained the solid component in an amount of 43% by weight.

In the first test, the honeycomb structures having different porosities were coated with a slurry and were dried, so that the catalyst was deposited in a manner that the thickness $t_1$ of the catalyst on general portions shown in FIG. 3 was about 20 μm (120 g/liter as a total carried amount). When the catalyst was not deposited in a desired amount through one coating process, the coating was repeated a plural number of times.

After the catalyst was deposited to the thickness $t_1$ of about 20 μm, a ratio ($t_2/t_1$) of the thickness $t_1$ of the catalyst deposited on the general portions to the thickness $t_2$ of the catalyst deposited at the corner portions was measured (FIG. 3).

Figure 8:
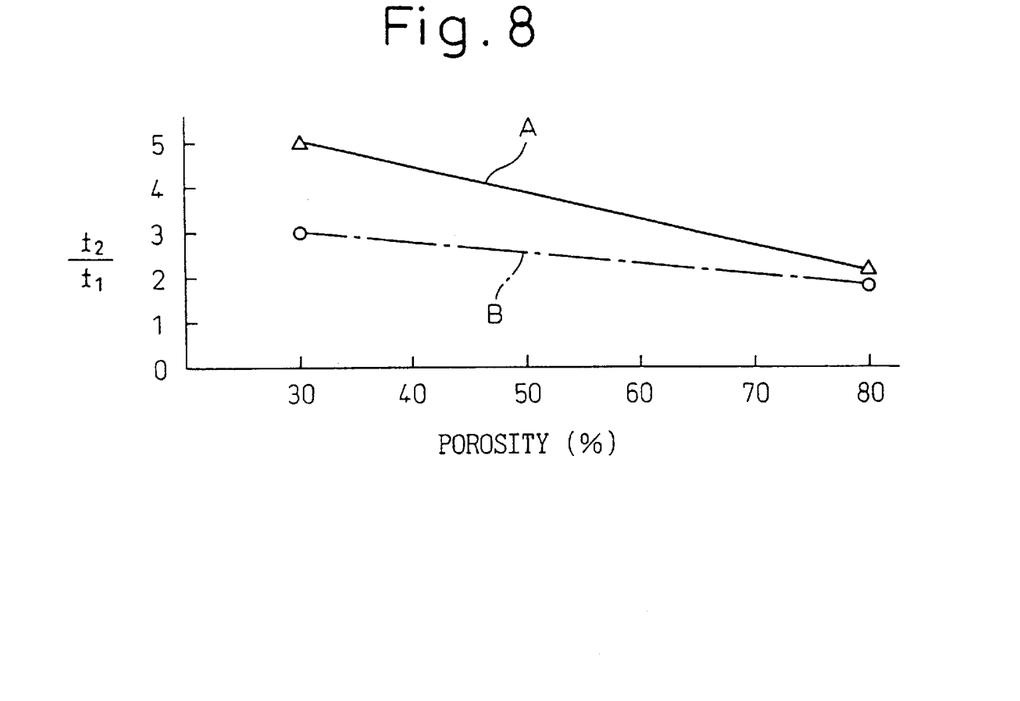
FIG. 8 is a diagram illustrating the effect of the slurry concentration upon the thickness of the carrier at the cell corners according to an embodiment 3.

The results were as shown in FIG. 8, wherein the abscissa represents the porosity (%) and the ordinate represents the ratio ($t_2/t_1$).

As will be seen from FIG. 8, when the slurry A of a high concentration is applied, the ratio becomes greater than when the slurry B of a low concentration is applied, and the thickness $t_2$ increases. When either the slurry A or the slurry B is applied, the ratio decreases with an increase in the porosity, and the thickness $t_2$ approaches the thickness $t_1$ as the porosity increases.

In the second test, he amounts of the catalyst carried through one time of application on the honeycomb structures having different porosities, were measured using the slurries A and B. The carrying amounts were evaluated by the thickness $t_1$ of the catalyst carried on the general portions.

Figure 9:
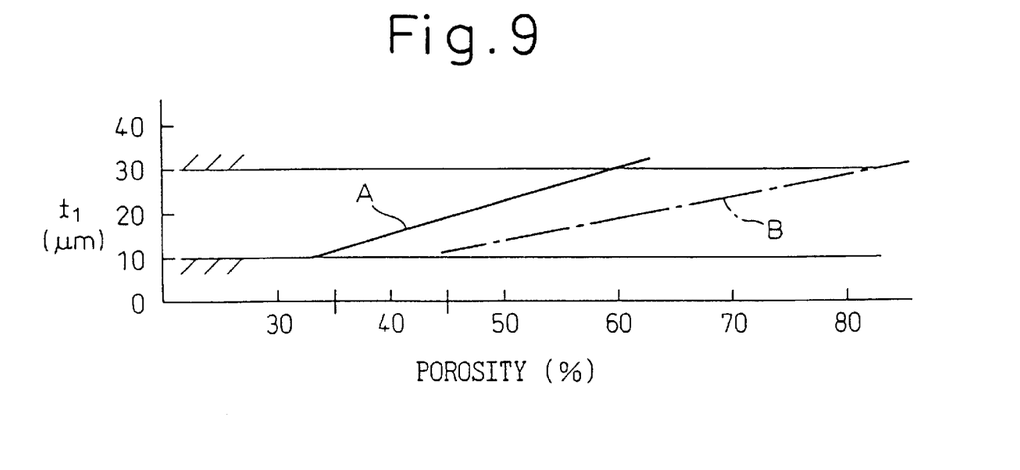
FIG. 9 is a diagram illustrating the effect of the slurry concentration upon the thickness of the carrier on the general portions of the cells according to the embodiment 3.

FIG. 9 illustrates the results of measurement wherein the abscissa represents the porosity (%) and the ordinate represents the thickness $t_1$ (μm) of the catalyst carried. The target thickness of the catalyst carried is 20 μm, and the products having the thickness over a range of 20±10 μm are acceptable.

As will be understood from FIG. 9, the amount of the catalyst carried through one time of application is smaller when the slurry B having a low concentration is applied than when the slurry A having a high concentration is applied. When the honeycomb structure having a porosity of about 35% is used, therefore, the slurry A must be used, or the slurry B must be applied a plural number of times. When the honeycomb structure having a porosity of not smaller than 45% is used, on the other hand, it will be seen that the catalyst is deposited allowing a sufficiently large thickness through one time of application despite the slurry B having a low concentration is used It will be understood from the foregoing results that upon controlling the porosity to within a range of from 45 to 80%, a state where the catalyst is favorably carried is realized through one time of application, making it possible to enhance performance of the device for cleaning exhaust gases as well as to decrease the cost.

Though the above-mentioned embodiments have dealt with the honeycomb structures having cells of a square shape, the cells may have any other shape such as hexagonal shape or the like shape in addition to the square shape.

What is claimed is:

1. A honeycomb structure in which partitioning walls, comprising, as a chief component, cordierite of a chemical composition containing 45 to 55% by weight of $SiO_2$, 33 to 42% by weight of $Al_2O_3$, and 12 to 18% by weight of MgO, are formed in the shape of a honeycomb, said partitioning walls having a thickness of not larger than 250 μm and a porosity of greater than 45% up to 80%:

the structure further comprising a catalyst carried on the surfaces of said partitioning walls.

2. A method of producing a honeycomb structure, comprising:

adding and kneading a binder and water to starting materials for cordierite;

extruding the kneaded material;

firing the extruded material, to form, in the shape of a honeycomb, partitioning walls comprising, as a chief component, cordierite of a chemical composition containing 45 to 55% by weight of $SiO_2$, 33 to 42% by weight of $Al_2O_3$, and 12 to 18% by weight of MgO, said partitioning walls having a porosity of greater than 45% up to 80%, wherein said starting materials for cordierite contain 5 to 15 parts by weight of combustible particles; and depositing a catalyst on surfaces of said partioning walls of said honeycomb structure.

3. The method of producing a honeycomb structure according to claim 2, wherein said combustible particles are carbon particles.

* * * * *